(12) United States Patent
Yun et al.

(10) Patent No.: US 11,325,159 B2
(45) Date of Patent: May 10, 2022

(54) CLASSIFYING AND PURIFYING APPARATUS OF SOLID BLOWING AGENTS AND METHODS OF CLASSIFYING AND PURIFYING SOLID BLOWING AGENTS

(71) Applicant: SKC SOLMICS CO., LTD., Pyeongtaek-si (KR)

(72) Inventors: Sunghoon Yun, Seongnam-si (KR); Jung Nam Lee, Incheon (KR); Tae Kyoung Kwon, Ulsan (KR); Jang Won Seo, Suwon-si (KR)

(73) Assignee: SKC SOLMICS CO., LTD., Pyeongtaek-si (KR)

( * ) Notice: Subject to any disclaimer, the term of this patent is extended or adjusted under 35 U.S.C. 154(b) by 0 days.

(21) Appl. No.: 16/953,403

(22) Filed: Nov. 20, 2020

(65) Prior Publication Data

US 2021/0154705 A1 May 27, 2021

(30) Foreign Application Priority Data

Nov. 22, 2019 (KR) .......................... 10-2019-0150987

(51) Int. Cl.
| | | |
|---|---|---|
| *B07B 9/00* | (2006.01) | |
| *B03C 1/30* | (2006.01) | |
| *B07B 4/02* | (2006.01) | |
| *C08J 9/22* | (2006.01) | |

(52) U.S. Cl.
CPC ............. *B07B 9/00* (2013.01); *B03C 1/30* (2013.01); *B07B 4/02* (2013.01); *C08J 9/22* (2013.01); *C08J 2203/22* (2013.01)

(58) Field of Classification Search
CPC .... B07B 9/00; B07B 4/02; B07B 7/01; B03C 1/30; B03C 2201/20; B03C 2201/28; B03C 1/284; B03C 1/0332; C08J 9/22; C08J 2203/22; B01D 46/0005; B01D 46/0034; B04C 2009/002; B04C 2009/004; B04C 2009/008; B04C 5/103
USPC ........................................................ 209/39
See application file for complete search history.

(56) References Cited

U.S. PATENT DOCUMENTS

| | | | |
|---|---|---|---|
| 10,413,852 B2 * | 9/2019 | Hopkins ................ | B01D 29/33 |
| 2016/0214117 A1 * | 7/2016 | Jackson ................ | B03C 1/0332 |

FOREIGN PATENT DOCUMENTS

| | | | | |
|---|---|---|---|---|
| CN | 202823608 U | | 3/2013 | |
| CN | 107930772 A | * | 4/2018 | ............ B02C 13/18 |
| CN | 107930772 A | | 4/2018 | |
| CN | 110153004 A | | 8/2019 | |
| CN | 209317342 U | * | 8/2019 | |
| CN | 110280404 A | * | 9/2019 | |
| CN | 209393317 U | * | 9/2019 | |
| JP | 55-152577 A | | 11/1980 | |

(Continued)

*Primary Examiner* — Gene O Crawford
*Assistant Examiner* — Muhammad Awais
(74) *Attorney, Agent, or Firm* — NSIP Law (57) ABSTRACT

A classifying and purifying apparatus of a solid blowing agent includes a classifier which classifies a supplied solid blowing agent into first microspheres and second microspheres, a storage connected to the classifier, in which the classified first microspheres flow in to be stored and emitted, and a filter arranged on the moving route of the solid blowing agent or the first microspheres which separates metallic substance from the object of filtering comprising the solid blowing agent or the first microspheres.

19 Claims, 6 Drawing Sheets

(56) References Cited

FOREIGN PATENT DOCUMENTS

| | | | | |
|---|---|---|---|---|
| JP | 55152577 | A | * | 11/1980 |
| KR | 10-0743033 | B1 | | 7/2007 |
| KR | 100743033 | B1 | * | 7/2007 |
| KR | 10-2015-0063725 | A | | 6/2015 |
| KR | 20150063725 | A | * | 6/2015 |
| KR | 10-2015-0125314 | A | | 11/2015 |
| KR | 10-1669283 | B1 | | 10/2016 |
| KR | 10-1695000 | B1 | | 1/2017 |
| KR | 10-2017-0073795 | A | | 6/2017 |
| KR | 10-1808166 | B1 | | 12/2017 |
| KR | 101808166 | B1 | * | 12/2017 |
| KR | 10-2018-0017767 | A | | 2/2018 |
| KR | 10-1853021 | B1 | | 4/2018 |
| TW | 350786 | B | | 1/1999 |

* cited by examiner

CLASSIFYING AND PURIFYING APPARATUS OF SOLID BLOWING AGENTS AND METHODS OF CLASSIFYING AND PURIFYING SOLID BLOWING AGENTS

CROSS-REFERENCE TO RELATED APPLICATIONS

This application claims the benefit under 35 USC 119(a) of Korean Patent Application No. 10-2019-0150987 filed on Nov. 22, 2019, in the Korean Intellectual Property Office, the entire disclosure of which is incorporated herein by reference for all purposes.

BACKGROUND

1. Field

The present disclosure relates to a classifying and purifying apparatus to classify and purify solid blowing agents and methods of classifying and purifying solid blowing agents.

2. Description of the Background

In manufacturing processes of semiconductors, a chemical mechanical polishing (CMP) process may be implemented to chemical-mechanically polish away unevenness of a wafer surface. It is mostly carried out by the method of supplying slurry for the surface of a wafer to react chemically and performing relative movement of a platen and a head, in the state of letting a wafer be attached to the head and be contacted to the surface of a polishing pad formed on the platen.

A polishing layer included in the polishing pad takes charge of an important role for embodying performances of chemical mechanical polishing as one of the essential materials performing an important function in the chemical mechanical polishing process.

The polishing layer mostly has pores, and various methods are used for forming the pores. Among them a solid blowing agent forms pores with a constant size inside the polishing layer in the manufacturing process of the polishing layer.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a classifying and purifying apparatus of a solid blowing agent includes a classifier which classifies a supplied solid blowing agent into first microspheres and second microspheres, a storage connected to the classifier, in which the classified first microspheres flow in to be stored and emitted, and a filter arranged on the moving route of the solid blowing agent or the first microspheres, which separates metallic substance from the object of filtering including the solid blowing agent or the first microspheres.

The filter may include a filter housing having an inside filter space configured to pass the solid blowing agent or the first microspheres, a filter cover arranged on the filter housing to be detachable for opening and closing of the filter space, and a filter material arranged in the filter space and generating magnetic force.

The metallic substance may be attached to the filter material by the magnetic force.

The filter material may include a holder located in the filter space, and a magnet arranged on the holder.

The metallic substance may be attached to the holder to be eliminated from the object of filtering.

A filter inlet connected to the filter space may be formed in the filter housing, and the filter inlet may be connected to a direction tangent to a perimeter of the filter space in a lower portion of the filter housing.

The object of filtering may move in a vortex when contacting with the filter material.

A filter outlet, which emits the object of filtering in which the metallic substance has been eliminated may be formed in the filter housing or the filter cover.

The filter cover may be arranged on an opened side of the filter housing, the filter outlet may be formed on the filter cover, and the object of filtering may gradually ascend when contacting with the filter material in the filter space to be emitted to the outside of the filter housing through the filter outlet.

The solid blowing agent may have a density of 100 kg/m$^3$ or less.

The classifier may include a classifying housing having an inside classifying space, a gas supplying hole connected to the classifying space, and an emitting hole configured to classify and connected to the classifying space.

The classifying space may be configured to classify a solid blowing agent into first microspheres and second microspheres, the first microspheres may be emitted from the emitting hole, the gas supplying hole may be configured to supply flowing gas, the flowing gas being dry air or inert gas, and the first microspheres may have a moisture content of 3 wt % or less.

The classifier may include a classifying housing having an inside classifying space, a classifying stirrer arranged in the classifying space, and an emitting hole configured to classify which connects the classifying space with the storage.

The classifying stirrer may include a shaft arranged along a vertical length direction of the classifying housing to be rotatable, and a plurality of stirring blades arranged along the length direction of the shaft.

The filter may be arranged in any one location selected from the group consisting of in front of the classifier, a position between the classifier and the storage, in rear of the storage, and combinations thereof.

In another general aspect, a classifying and purifying apparatus of a solid blowing agent includes a classifier in which classifying space is formed, and a filter arranged in front, in rear, or in front and in rear of the classifier, wherein the classifier includes a classifying housing comprising the classifying space, a gas supplying hole connected to the classifying space, and an emitting hole configured to classify connected to the classifying space, wherein the classifying space classifies a solid blowing agent into first microspheres and second microspheres, the first microspheres being emitted from the emitting hole, and wherein the filter separates metallic substance from an object of filtering that is inflowed.

The classifier may further include a vortex generating material located in the classifying space and arranged to neighbor on the gas supplying hole.

The classifier may further include a gas emitting hole, and an emitting filter may be arranged in the gas emitting hole.

The classifier may further include a vibration generator arranged on the classifying housing.

The classifying and purifying apparatus of a solid blowing agent may further include a supplier which supplies the solid blowing agent to the classifier, a storage in which the first microspheres flow in to be stored, and a retriever in which the second microspheres are retrieved.

The gas supplying hole may supply flowing gas, the flowing gas may be dry air or inert gas, and the first microspheres may have a moisture content of 3 wt % or less.

In another aspect, a method of classifying and purifying a solid blowing agent includes classifying a solid blowing agent into first microspheres and second microspheres depending on a descent rate of the solid blowing agent which is raised by flowing gas supplied to a classifying space, and purifying the first microspheres by separating them from metallic substance using a magnetic filter when they pass the filter.

The flowing gas may be dry air or inert gas, and the first microspheres may have a moisture content of 3 wt % or less.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may be also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

The present disclosure provides an apparatus to classify and purify a solid blowing agent which can classify a solid blowing agent and eliminate a metallic foreign substance contained in the solid blowing agent, and a classifying and purifying method of a solid blowing agent using the apparatus.

A classifying and purifying apparatus of a solid blowing agent will be described according to one or more examples of an embodiment, referring to FIG. 1 to FIG. 6.

Figure 1:
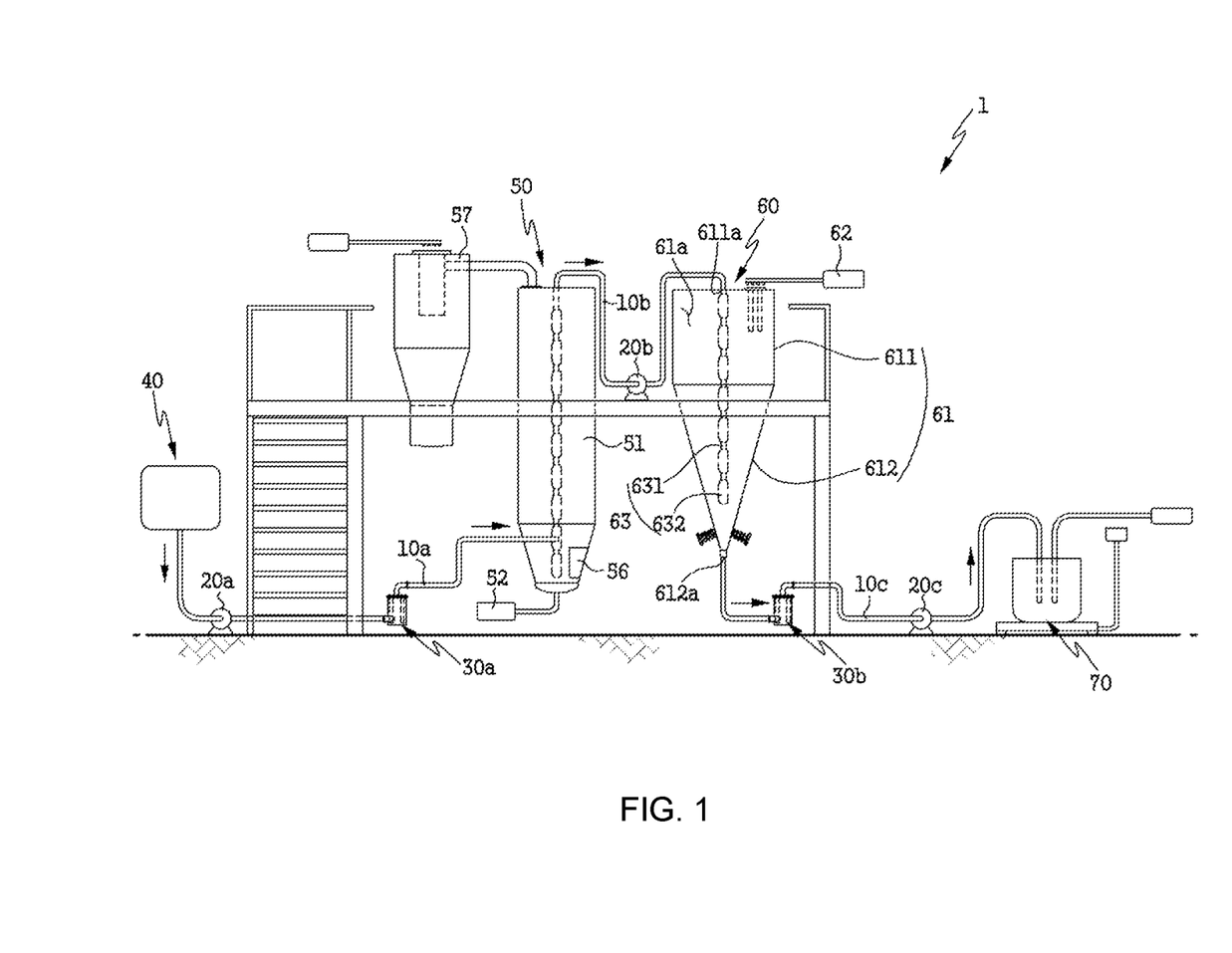
FIG. 1 is a schematic diagram showing a classifying and purifying apparatus of a solid blowing agent according to one or more examples of an embodiment.
Figure 2:
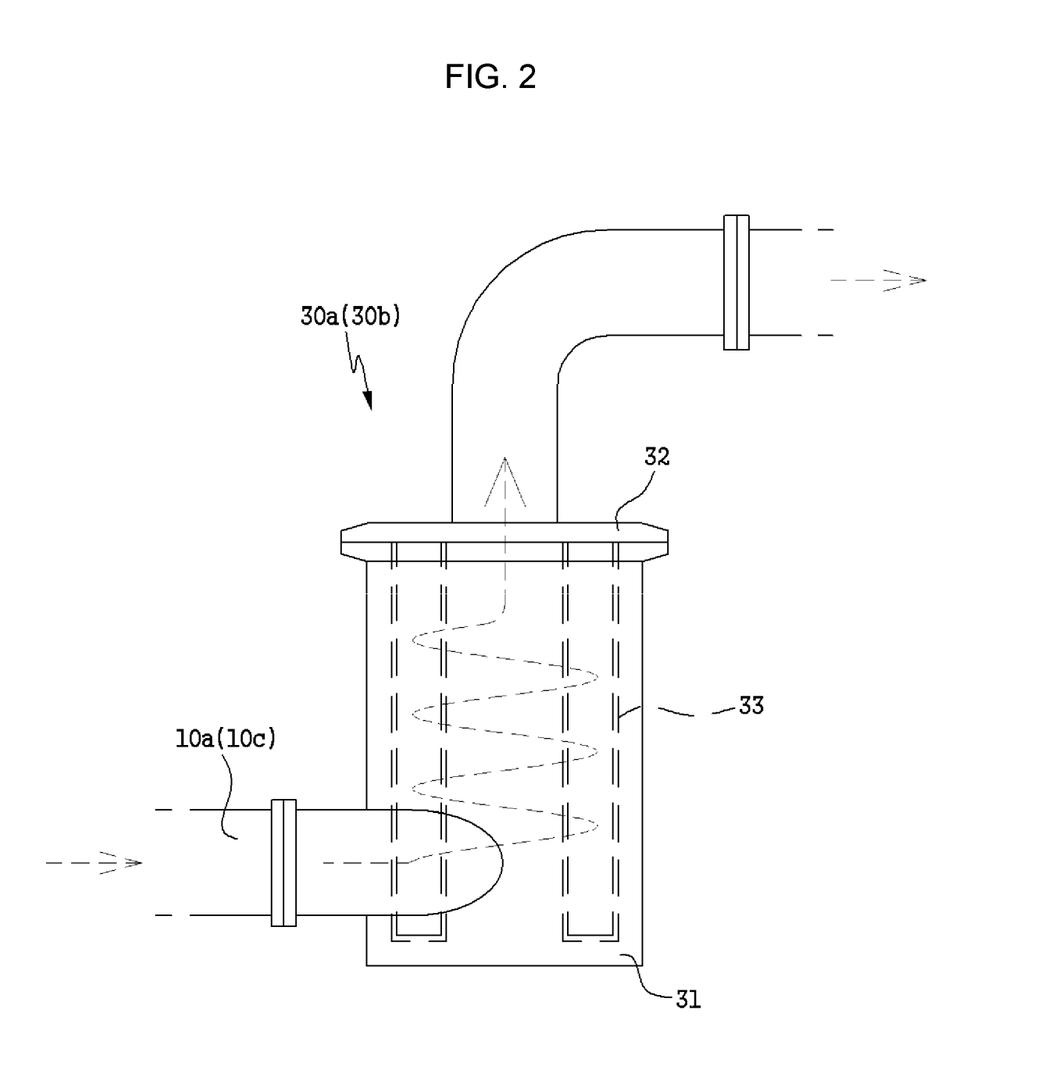
FIG. 2 is a schematic diagram showing one or more examples of a filter in FIG. 1.
Figure 3:
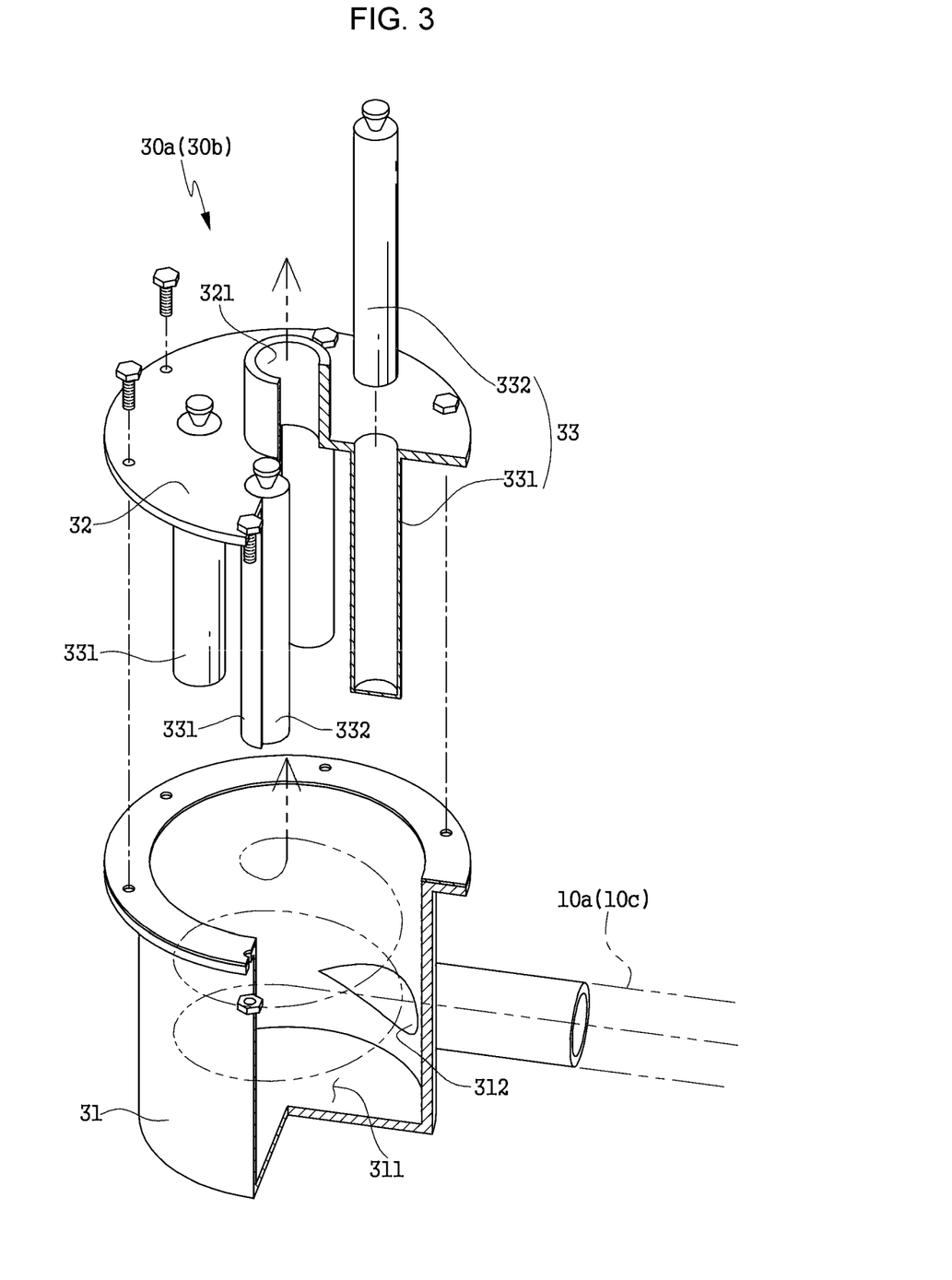
FIG. 3 is an exploded perspective view showing the filter in FIG. 2.
Figure 4:
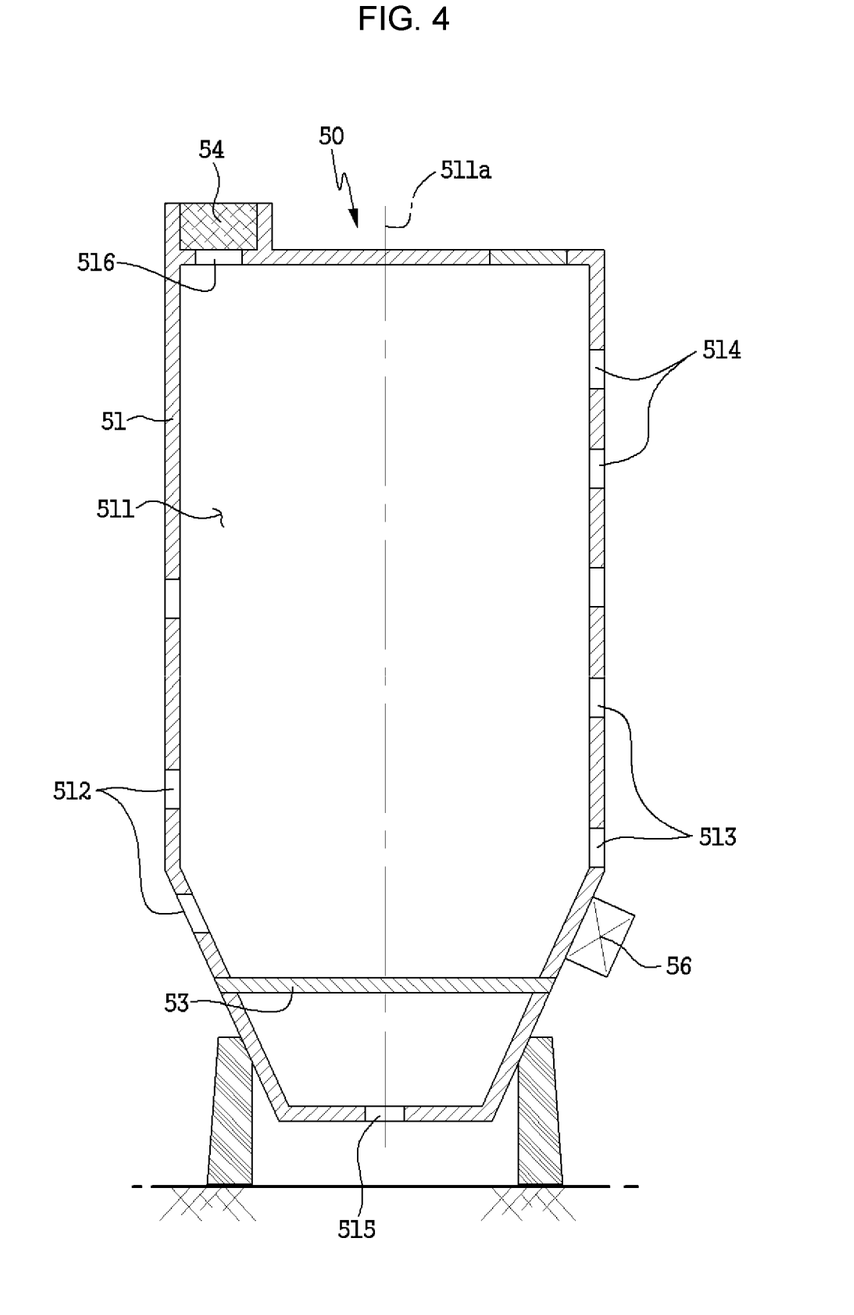
FIG. 4 is a schematic diagram showing one or more examples of a classifier in FIG. 1.
Figure 5:
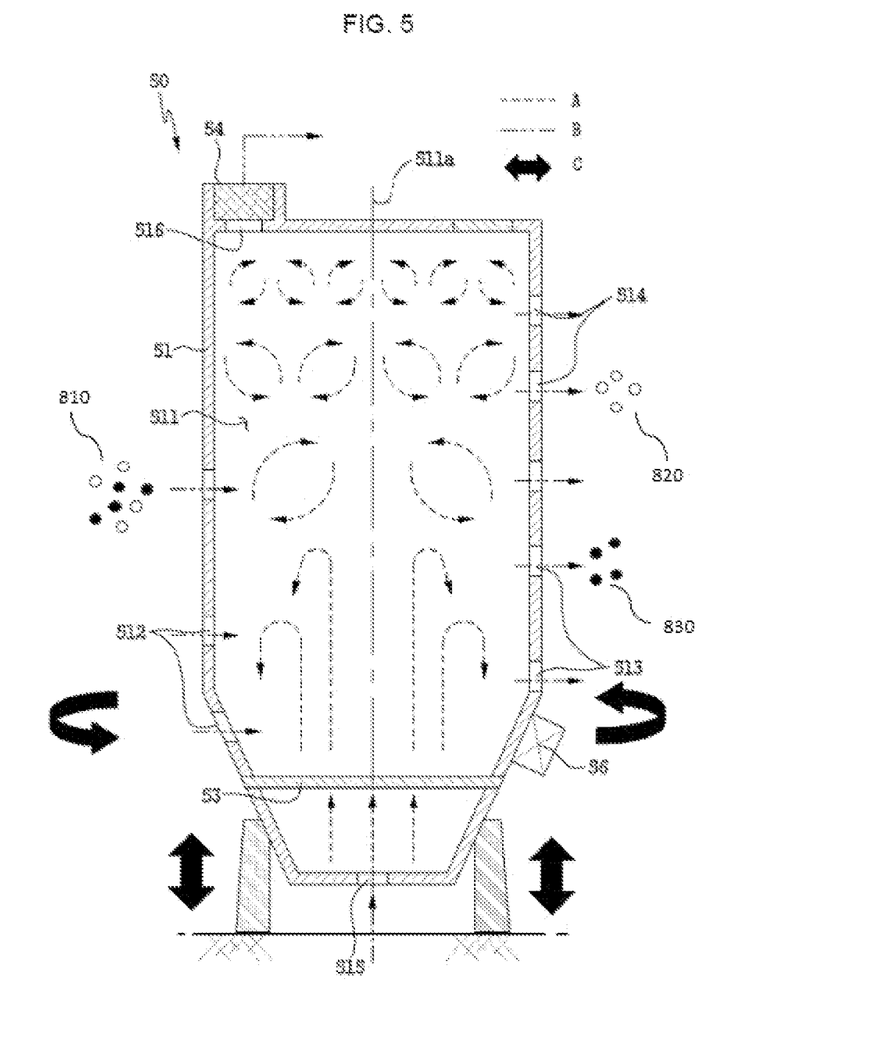
FIG. 5 is a work state diagram of the classifier in FIG. 4.
Figure 6:
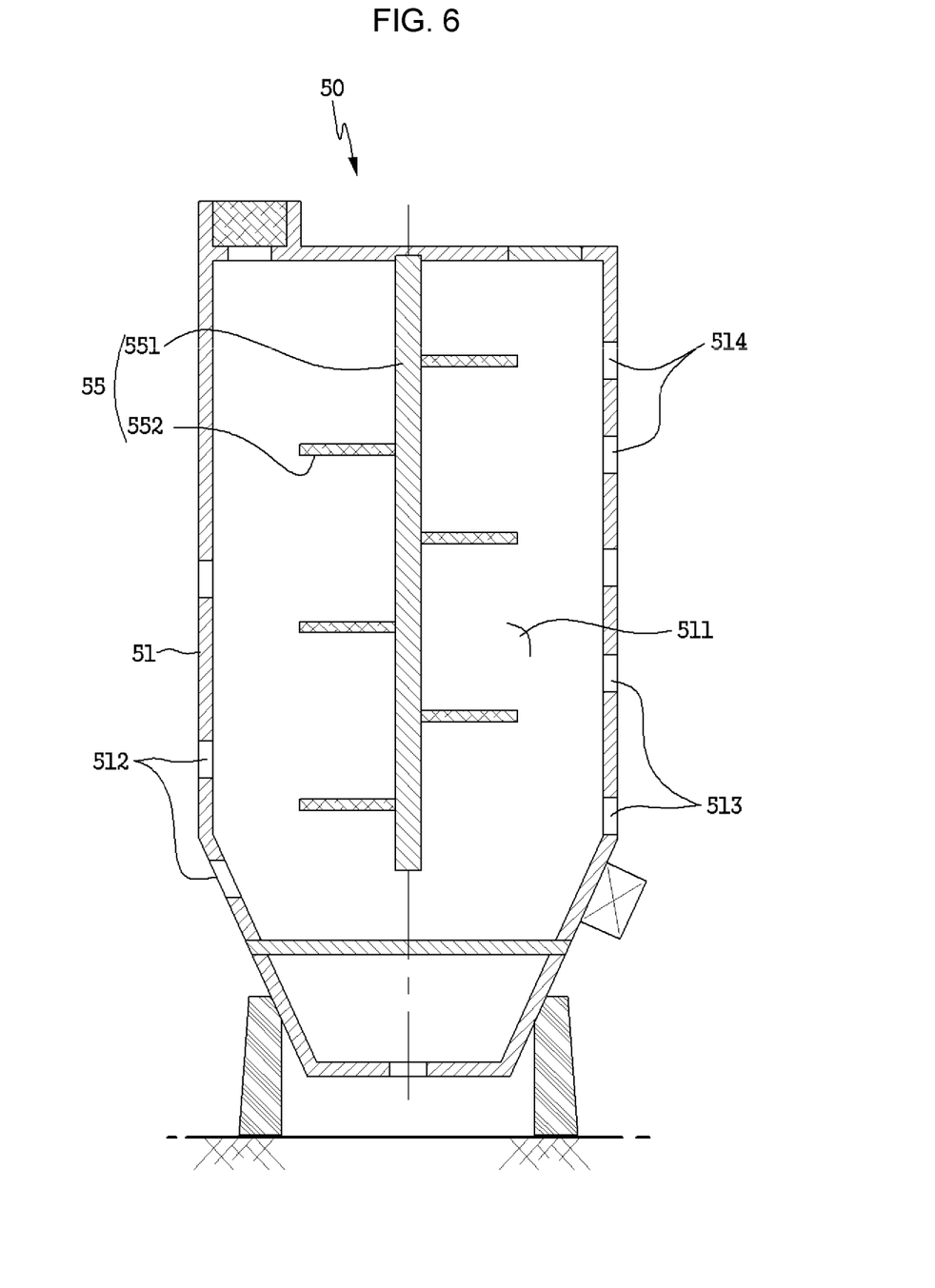
FIG. 6 is a schematic diagram showing one or more examples of another embodiment of the classifier in FIG. 1.

FIG. 1 is a schematic diagram showing a classifying and purifying apparatus of a solid blowing agent according to one or more examples of an embodiment. FIG. 2 is a schematic diagram showing one or more examples of a filter in FIG. 1. FIG. 3 is an exploded perspective view showing the filter in FIG. 2. FIG. 4 is a schematic diagram showing one or more examples of a classifier in FIG. 1. FIG. 5 is a work state diagram of the classifier in FIG. 4. FIG. 6 is a schematic diagram showing one or more examples of another embodiment of the classifier in FIG. 4.

Referring to FIG. 1, a classifying and purifying apparatus 1 according to the present embodiment comprises a classifier 50 that classifies a supplied solid blowing agent into first microspheres and second microspheres, a storage 60 connected to the classifier 50, in which the classified first microspheres may flow in to be stored and emitted, and filters 30a, 30b arranged on the moving route of the solid blowing agent or the first microspheres to separate metallic substance from the object of filtering comprising the solid blowing agent or the first microspheres.

To a solid blowing agent, through manufacturing processes or carrying-manufacturing processes, metal impurities of very small size (hereinafter, referred to as metallic substance) could be mixed and flow in. In addition, also through purifying and classifying processes foreign substance comprising metallic substance could be mixed and flow in.

The metallic substance greatly affects properties of the final produced substance. So that the classifying and purifying apparatus 1 of a solid blowing agent eliminates the metallic substance from the object of filtering comprising a solid blowing agent of first microspheres classified from the solid blowing agent.

The solid blowing agent may have a density of 100 kg/m$^3$ or less, a density of 80 kg/m$^3$ or less, or a density of 60 kg/m$^3$ or less. And the solid blowing agent may have a density of 10 kg/m$^3$ or more.

The solid blowing agent may comprise a thermally expanded microcapsule. Specifically, the solid blowing agent may be a micro balloon structure having an average size of 5 to 200 μm (microns), or one having an average size of 10 to 50 μm.

The solid blowing agent may be particles comprising a skin which comprises a thermoplastic resin; and a blowing agent enclosed inside the skin, or may be one in which the particles are expanded. The thermoplastic resin may be any one or more selected from the group consisting of a vinylidene chloride-based copolymer, an acrylonitrile-based copolymer, a methacrylonitrile-based copolymer, and an acrylic-based copolymer. Moreover, the blowing agent enclosed inside may be any one or more selected from the group consisting of hydrocarbons having carbon atoms of 1 to 7. Specifically, the blowing agent enclosed inside may be selected from the group consisting of low molecular weight hydrocarbons such as ethane, ethylene, propane, propene, n-butane, isobutane, butene, isobutene, n-pentane, isopentane, neopentane, n-hexane, heptane, and petroleum ether; chlorofluoro hydrocarbons such as trichlorofluoromethane ($CCl_3F$), dichlorodifluoromethane ($CCl_2F_2$), chlorotrifluoromethane ($CClF_3$), and tetrafluoroethylene; and tetraalkylsilanes such as tetramethylsilane, trimethylethylsilane, trimethylisopropylsilane, and trimethyl-n-propylsilane.

The solid blowing agent may be commercially available EXPANCEL (trade name), but the solid blowing agent is not limited thereto.

The classifying and purifying apparatus 1 of a solid blowing agent according to the present embodiment may further comprise a supplier 40, a packer 70, first, second, and third pipes 10a, 10b, 10c, and first, second, and third pumps 20a, 20b, 20c.

The classifier 50 may be connected through the first pipe 10a to the supplier 40 in which the solid blowing agent that is the object of classifying has been stored in a form of powder. The first pump 20a sending the solid blowing agent may be arranged in the first pipe 10a. The solid blowing agent stored in the supplier 40 may be moved along the first pipe 10a by operation of the first pump 20a, to be supplied to the classifier 50. The classifier 50 may classify a supplied solid agent into first microspheres and second microspheres.

The classifier 50 may be connected to the storage 60 through the second pipe 10b. In the second pipe 10b, the second pump 20b may be arranged. The first microspheres classified from the solid blowing agent may be moved along the second pipe 10b by operation of the second pump 20b, to be supplied to the storage 60.

The storage 60 may be connected to the packer 70 through the third pipe 10c in which the third pump 20c has been arranged.

The filter may be arranged in any one selected from the first pipe 10a, the second pipe 10b, and the third pipe 10c, or the filters may be respectively arranged in two or more of the first pipe 10a, the second pipe 10b, and the third pipe 10c. The number of the arranged filter(s) may be determined based on the characteristics of the classifying and purifying of a solid blowing agent and the processing capacity of the classifying and purifying apparatus 1 of a solid blowing agent. The filters may be arranged in the first pipe 10a and the third pipe 10c. In this case the damage of the solid blowing agent which otherwise would be generated additively by metallic substance in a classifying process, can be prevented and the metallic substance which otherwise would flow in the classified solid blowing agent additively may be eliminated sufficiently.

The filter 30a arranged in the first pipe 10a separates metallic substance from the object of filtering comprising a solid blowing agent, and the filter 30b arranged in the third pipe 10c separates metallic substance from the object of filtering comprising first microspheres. The filter (not shown in drawings) arranged in the second pipe 10b separates metallic substance from the first microspheres moving through the second pipe 10b.

That is, the filters 30a, 30b produce the safe object of filtering by separating metallic substance from the object of filtering comprising the solid blowing agent or the first microspheres.

The filters 30a, 30b may further comprise a screener (not shown in drawings). The screener may eliminate substance of a certain size or larger. The screener may utilize general materials to separate the substance of a certain size or larger from the object of filtering, and the type or the form is not particularly limited.

The first pump 20a, the second pump 20b, and the third pump 20c arranged in the first pipe 10a, the second pipe 10b, and the third pipe 10c, respectively, may each be a pulsatory motion pump. Thereby the solid blowing agent moving through the first pipe 10a, and the first microspheres moving through the second pipe 10b and the third pipe 10c after being classified from the solid blowing agent may move stably in a fixed quantity without a change in supply.

The specific formation of the first pump 20a, the second pump 20b, and the third pump 20c is the same with the pulsatory motion pump with noticed formation, thus the detailed description will be omitted.

The supplier 40 comprises a supplying housing (not shown in drawings) having storing space (not shown in drawings) which can store the solid blowing agent to be classified, in a form of powder. In an upper portion of the supplying housing an inlet for the solid blowing agent may be formed, and in a lower portion an outlet for the solid blowing agent may be formed.

The supplier 40 may be connected to the classifier 50 through the first pipe 10a combined with the first pump 20a, and the solid blowing agent in the supplier 40 may be moved along the first pipe 10a by operation of the first pump 20a to be supplied to the classifier 50. The first pump 20a may transfer the solid blowing agent with a pressure of 0.5 to 2 bar. When the first pump 20a transfers the solid blowing agent with a pressure less than 0.5 bar, the flow of the solid blowing agent may not be smooth, and with a pressure more than 2 bar, the efficiency of eliminating foreign substance comprised in the solid blowing agent may be lowered.

The filter 30a arranged in the first pipe 10a may separate metallic substance from the solid blowing agent transferred from the supplier 40 to the classifier 50 through the first pipe 10a, so that the metallic substance is separated out of the object of filtering.

With further reference to FIG. 2 and FIG. 3, the filter 30a comprises a filter housing 31 inside which filter space 311 passed by a solid blowing agent has been formed, a filter cover 32 for opening and closing of the filter space 311, and a filter material 33 which has been arranged in the filter space 311 and generates magnetic force.

The filter housing 31 may have a preset length and may have been erected with vertical direction. For one example, inside the filter housing 31, the filter space 311 opened to an upper portion may be formed. For another example, the filter space may be opened to a side portion of the filter housing 31.

In the perimeter of a lower portion of the filter housing 31, a filter inlet 312 may be formed to which the first pipe 10a connected to the supplier 40 has access. For one example, the filter inlet 312 may be connected to the direction tangent to the perimeter of the filter space 311. For another example, the filter inlet 312 may be formed on the floor of the filter housing 31.

The solid blowing agent moved along the first pipe 10a from the supplier 40 by operation of the first pump 20a, may flow into the filter space 311 through the filter inlet 312. For one example, the solid blowing agent which has flowed in the filter space 311 through the filter inlet 312 tangent to the perimeter of the filter space 311, may move to an opened direction doing volution along the perimeter of the filter space 311. For another example, the solid blowing agent which has flowed in the filter space 311 through the filter inlet 312 may ascend gradually to the direction of the opened upper portion. In filter space 311 a filter material may be located, and it may induce generation of a vortex to the flow of the solid blowing agent.

The filter cover 32 is combined to be detachable with the filter housing 31 in which the filter space 311 is opened so that the opening portion of the filter space 311 may be opened and closed. A sealing material (not shown in drawings) may be arranged between the filter cover 32 and the filter housing 31 so that the solid blowing agent passing the filter space 311 does not leak between the filter cover 32 and the filter housing 31.

For one example, in the filter cover 32 a filter outlet 321 connected to the filter space 311 may be formed. For another example, the filter outlet 321 may be formed in the perimeter of the filter housing 31. The location of the filter outlet 321 may be different depending on the type or the density of the object of filtering. The solid blowing agent passing the filter space 311 through the filter inlet 312 may be emitted through the filter outlet 321 to the outside of the filter housing 31.

The filter material 33 may comprise a holder 331 located in the filter space 311, and a magnet 332 located in the holder 331.

The holder 331 may be formed in the shape of a round bar with an empty inside out of bar shapes. The form of the holder 331 may be changed variously as needed. For one example, the holder 331 may be connected to the filter cover 32. For another example, the holder 331 may be formed in one body with the filter housing 31, or may be combined with it by the method of screw. The holder 331 may be formed in one body with the filter cover 32 or the filter housing 31, or may be combined by the method of screw to be detachable. The filters 30a, 30b may each independently comprise one, or two or more holders 331. For example, the filters 30a, 30b may comprise three to ten holders 331.

The inside of the holder 331 is opened through the filter cover 32 or the filter housing 31. The holder 331 may be in contact with or stay away from the perimeter of the filter space 311. The neighboring holders 331 may be side by side to each other, or spaced apart from each other. The external surface of the holder may have been formed to be smooth. The solid blowing agent passing the filter space 311 with doing volution may move to the filter outlet 321, contacting with the external perimeter of the holder 331.

The magnet 332 may be arranged inside the holder 331. The magnet 332 may comprise a normal magnet or an electromagnet. The magnet may be a neodymium magnet. The magnet may have a magnetic force of 10,000 Gauss to 12,000 Gauss. Magnetism is formed around the holder by the magnet and metallic substance may be attached to the magnet. By the magnetic force, the metallic substance contained in the solid blowing agent doing volution in the filter space 311 may be attached to the external perimeter of the holder 331. The magnet 332 separates metallic substance mixed in the object of filtering which passes the filter space 311. Through the filter, a purified solid blowing agent or purified first microspheres can be prepared.

The holder 331 may be withdrawn to the outside of the filter housing 31. The withdrawing of the holder may be carried out by the method of detachment of the filter cover 32 from the filter housing 31. The magnet 332 also may be detached from the holder 331. By the detachment of the magnet, the holder magnetic force around the holder is eliminated and metallic substance attached to the external perimeter of the holder 331 can be detached from the holder 331.

The metallic substance separated from the solid blowing agent that is the object of filtering may be attached to the holder 331, and the purified solid blowing agent by eliminating of metallic substance in the holder 331 may be emitted to the outside of the filter housing 31 through the filter outlet 321 and flow along the pipe to be supplied to the classifier 50.

The purified solid blowing agent in which metallic substance and so on are eliminated through passing the filter 30a may be supplied to the classifier 50 and classified depending on the size, the density and so on.

With further reference to FIG. 4 and FIG. 5, the classifier 50 comprises a classifying housing 51 inside which classifying space 511 has been formed, a gas supplying hole 515 connected to the classifying space 511, and an emitting hole for classifying connected to the classifying space 511. The classifier 50 may further comprise a vortex generating material 53 located in the classifying space 511 and arranged to neighbor on the gas supplying hole 515. The classifier 50 may further comprise a vibration generator 56 arranged on the classifying housing 51. The classifier 50 may further comprise a classifying stirrer 55. The classifier 50 may further comprise a retriever 57.

Inside the classifying housing 51, the classifying space into which the solid blowing agent flows through the first pipe 10a has been formed. The solid blowing agent may pass or not pass the filter 30a. In the classifying housing 51, the inside height of the classifying space 511, which is the maximum height measured in the length direction of the central axis 511a arranged in the up and down direction at the center of the classifying space 511, is greater than the width of the classifying space 511, which is the maximum width measured in the direction perpendicular to the central axis 511a. The degree of size difference may be 1.5 times or more, or 3 times or more. In this manner, when the height is sufficiently greater than the width, classification of the solid blowing agent can be carried out more efficiently.

In the external perimeter of the classifying housing 51, inflow holes for classifying 512 have been formed with intervals along the vertical length direction. The inflow holes for classifying 512 connect the supplier 40 with the classifying space 511 through the first pipe 10a. The inflow holes for classifying 512 may be located on 60% or less of the height based on the lower portion of the classifying housing 51, or in 50% or less of that. One to five inflow hole(s) for classifying 512 may be formed with constant intervals in location of 50% or less based on the lower portion in the length of the classifying housing 51.

The emitting holes for classifying comprise a first microsphere emitting hole 513 and a second microsphere emitting hole 514. The emitting holes may further comprise a third microsphere emitting hole (not shown in drawings). Thereby in the classifying housing 51, the first microspheres 830, the second microspheres 820, and/or the third microspheres classified from the solid blowing agent 810 may be emitted through the emitting holes for classifying.

The first microsphere emitting hole 513 and the second microsphere emitting hole 514 have been formed in plural with intervals along the vertical length direction of the classifying housing 51. The third microsphere emitting hole also may be formed in plural with intervals along the vertical length direction.

The first microsphere emitting hole 513 and the second microsphere emitting hole 514 may be located on different heights from the lower portion of the classifying housing 51. In addition, the first microsphere emitting hole 513 has been formed in the lower portion of the classifying housing 51, and the second microsphere emitting hole 514 has been formed in the upper portion of the classifying housing 51. The first microsphere emitting hole 513 and the second microsphere emitting hole 514 can retrieve the first microspheres and the second microspheres classified from the solid blowing agent varying in classifying degree and distribution of particle size.

For one example, in the lower portion of the classifying housing 51 a gas supplying hole 515 connected to the classifying space 511 may be formed. For another example, the gas supplying hole 515 may be formed in the perimeter side of the classifying housing 51. To the gas supplying hole 515 a gas supplier 52 which supplies nitrogen ($N_2$) gas or dry air may be connected. The dry air means the air having a humidity of 3 wt % or less. The nitrogen gas can eliminate moisture which may be in the surface of the solid blowing agent particles, and particularly provide microspheres having lowered moisture content. The microspheres having lowered moisture content may bring a defect decreasing effect to a manufactured polishing layer and substrates like a wafer polished using the same. In addition, the microspheres having lowered moisture content substantially prevent defect generation by side reactions which could be caused from moisture contained in the surface of microspheres, and may bring a defect decreasing effect to the manufactured polishing layer and substrates like a wafer polished using the same. Thereby the polishing layer which may decrease defect generation on the polished substrates may be manufactured.

The vortex generating material 53 may be arranged in a lower portion of the classifying space 511. Inert gas or dry air (hereinafter, referred to as flowing gas) which flows into the classifying space 511 through the gas supplying hole 515, passes the vortex generating material 53. The inert gas may be applied with any one selected from the group consisting of hydrogen gas, helium gas, argon gas, nitrogen gas, and compositions thereof. For example, nitrogen gas may be applied.

Flowing gas may pass the vortex generating material 53 when injected into the classifying space 511, the injecting may be performed with constant flux and strength in a section which is perpendicular to the central axis 511a overall, and it may bring overall even classifying effect to the classifying space 511.

The vortex generating material 53 may comprise a membrane-shaped material having multiple holes. The holes may have a diameter of 20% or less with respect to a diameter of the microspheres ($D_{50}$), a diameter of 15% or less with respect to a diameter of the microspheres, or a diameter of 10% or less with respect to a diameter of the microspheres.

The vortex generating material 53 may function as preventing inflow of the solid blowing agent to the gas supplying hole or the connecting pipe therefor with an effect of dispersing flowing gas.

The vortex generating material 53 may comprise a membrane in which multiple holes with 10 μm or less, or 5 μm or less are formed. When such a membrane-shaped vortex generating material 53 is applied, the solid blowing agent will not fall below the vortex generating material 53 thereby enabling an efficient operation of the process.

The flowing gas passing the vortex generating material 53 may form an updraft from a lower portion to an upper portion of the classifying space 511. The flowing gas in which a vortex has been formed by the vortex generating material may ascend doing volution. The ascent of the flowing gas makes a difference to the speed of the solid blowing agent when it descends after ascent, accordingly the solid blowing agent can be classified depending on the particle size.

In an upper portion of the classifying housing 51, a gas emitting hole 516 emitting the flowing gas which has flowed in the classifying space 511 may be formed. In the gas emitting hole 516, an emitting filter 54 filtering foreign substance, residual microspheres and so on comprised in the flowing gas to be emitted may be arranged.

The vibration generator 56 may be arranged on the classifying housing 51. The vibration generator 56 may induce vibration in the classifier 50 in the vertical direction in which the vibration moves up and down on a central axis 511a, in the horizontal direction in which the vibration moves left and right on a central axis 511a, or in the vertical and horizontal directions in which the vibration is given to all up, down, left, and right. The vibration generator 56 may turn the classifying housing 51 in clockwise direction or counterclockwise direction on the central axis 511. Thereby, the classifying housing 51 may be turned in the vertical direction, the horizontal direction, or the vertical and horizontal directions by the vibration generator 56.

The classification of the solid blowing agent which has flowed in the classifying space 511 may be carried out as follows.

The solid blowing agent in the supplier 40 may be moved along the first pipe 10a by operation of the first pump 20a and flow into the classifying space 511 through any one inflow hole for classifying 512 out of inflow holes for classifying 512. For the classifying space 511 the flowing gas is supplied to classify the solid blowing agent.

The flowing gas which has flowed in the classifying space 511 flows in the direction of the gas emitting hole 516 passing the vortex generating material 53. At that time, the flowing gas flows generating a vortex or spin (marked as a dotted line arrow "A" inside the classifying space in FIG. 5). The flowing gas flows to an upper portion in which the gas emitting hole 516 has been formed.

The solid blowing agent which has flowed in the classifying space 511 ascends following the flowing gas, at that time the flow of the flowing gas may be weakened, and thereby the descent of the solid blowing agent in the classifying space 511 may be done, or the descent of the solid blowing agent may be accelerated in the classifying space 511, by the downflow caused from turning force, vibration and so on, that are transferred from the external (the flow of the solid blowing agent is marked as a two-dot chain line arrow "B" and the vibration is marked as an arrow "C" in FIG. 5). At that time the flow of air in the classifying space 511 forms a circulating flow of air cells, so that when compared to the size of the solid blowing agent, heavy particles, too light particles, or particles in remarkably different forms are classified due to differences in the speed of ascent or descent.

That is, the solid blowing agent floats in the classifying space 511 following the flow of flowing gas, and the solid blowing agent descends in different speeds depending on the weight and the size following impacts of gravity, vibration and so on. Thereby the solid blowing agent may be classified depending on the size and retrieved.

In this case, the solid blowing agent may be classified into the first microspheres having an average particle size of 5 to 200 µm, and the second microsphere having an average particle size of less than 5 µm. Impaired ones or ones having an excessively high density out of the solid blowing agent may be classified as third microspheres. Thus, the classifying space 511 may classify the solid blowing agent into the first to the third microspheres. The particle size of the solid blowing agent to be classified may be different depending on the design of the polishing pad.

Like this the solid blowing agents that ascend or descend following impacts of flowing gas and so on may be emitted to the outside of the classifying housing 51 through the first microsphere emitting hole 513, the second microsphere emitting hole 514, and the third microsphere emitting hole (not shown in drawings) that are formed depending on the height of the classifying housing 51.

Classifying of the solid blowing agent may be carried out by the method of supplying the flowing gas described above, or by the method of letting the solid blowing agent flow from the inflow hole for classifying 512 to the classifying space 511 in which an air flow has been formed by supply of flowing gas, and the two methods mentioned above may be applied at the same time.

When a hollow microsphere is applied as a solid blowing agent, the weight of each hollow microsphere is considerably light, so that the descent time of the hollow microsphere raised by flowing gas may be considerably long, or the descent may be not performed well substantially during the time at which a flow of the flowing gas is present. This may lower the efficiency of classifying.

The present disclosure may apply a vibration process using a vibration generator as a method which can accelerate the descent of the hollow microsphere.

The vibration process, in sequence or simultaneously, may add the vertical direction vibration which moves up and down on the central axis 511a, the horizontal direction vibration which moves left and right on the central axis 511a, and the vertical and horizontal direction vibration which adds vibration to all up, down, left and right, to the classifying housing 51 through the vibration generator.

In addition, to the vibration process the method that is turning the classifying housing 51 with clockwise direction or counterclockwise direction on the central axis 550 may be applied, or the method that is performing repetitive turns with clockwise direction and counterclockwise direction may be applied.

The vibration applied in the vibration process may be a vibration of 100 to 10,000 Hz, of 500 to 5,000 Hz, or of 700 to 3,500 Hz. When the vibration is applied in this range, the solid blowing agent may be classified more efficiently.

Due to small and light characteristics of the solid blowing agent, it may be classified depending on the difference of speeds of the solid blowing agent when ascending and descending after ascending of flowing gas, but vibration may let a hollow microsphere which does not easily descend after being raised by the flowing gas descend more rapidly. That is, this vibration process may be performed by the method of down force vibrating that accelerates the descent of the solid blowing agent in the classifying space 511, and if the vibration process proceeds further more efficient and effective classification may be performed. Applying the polishing layer formed through this process enables manufacture of wafers with less defects.

The particle size of the solid blowing agent to be classified may be adjusted by flow rate of the flowing gas injected, a location of the first microsphere emitting hole 513, a degree of vibration and so on.

The classified first microspheres may have a moisture content of 3 wt % or less. The classified first microspheres may have a moisture content of 2.8 wt % or less. The classified first microspheres may have a moisture content of 2.6 wt % or less. The classified first microspheres may have a moisture content of 2.0 wt % or less. The classified first microspheres may have a moisture content of 1.5 wt % or less. The classified first microspheres may have a moisture content of 0.01 wt % or more.

The classified first microspheres may have a value of 0.5 to 2 as a particle distribution value (P) calculated by below Equation (1).

$$P=(D_{90}-D_{10})/D_{50} \qquad \text{Equation (1):}$$

Where $D_n$ means the diameter of an inorganic particle at N % in diameter distribution of 0 to 100%.

The classified first microspheres like these do not comprise a particle that has not been blown or a particle having defects, so they may form a polishing layer with more excellent qualities.

With further reference to FIG. 6, the classifying stirrer 55 turns following the rotation axis that is parallel or not parallel with the central axis 511a and turns inside the classifying space 511. The classifying stirrer 55 enable air and so on in the classifying housing 51 to turn and be mixed, and help classification of the solid blowing agent to be more efficiently performed.

The classifying stirrer 55 may comprise a stirrer. The stirrer comprises a shaft 551 located parallel with the central axis 511a and a plurality of stirring blades 552 that are connected to the shaft 551 and protrusive to the perimeter direction of the classifying space 511.

Referring to FIG. 1 again, the retriever 57 has been arranged to neighbor on the classifying housing 51, and inside which retrieving space (not shown in drawings) has been formed. The retrieving space has been connected to the classifying space 511 through the second microsphere emitting hole 514. The second microspheres emitted from the classifying space 511 through the second microsphere emitting hole 514 may flow in the retrieving space and be stored.

The first microsphere emitting hole 513 may be connected to the storage 60 through the second pipe 10b in which the second pump 20b has been arranged. The first microspheres classified from the classifying space 511 may move along the second pipe 10b to the storage 60. At that time the first microspheres pass through the filter (not shown in drawings) arranged in the second pipe 10b and the metallic substance comprised in the first microspheres may be eliminated. The filter may be the same as the filter 30a arranged in the first pipe 10a; thus, duplicated description will be omitted. The second pump 20b may also be the same as the first pump 20a; thus, duplicated description will be omitted.

Referring to FIG. 1 again, the storage 60 may comprise a storing housing 61 inside which storing space 61a has been formed, a gas supplier for storing 62 connected to the storing space 61a, and a storing stirrer 63 arranged in the storing space 61a. The storage 60 may store the first microspheres which have flowed in the storing space 61a through the second pipe 10b.

The storing housing 61 may have a length with up and down directions and comprise a first body 611 in which a first microsphere inflow hole 611a connected with the second pipe 10b has been formed, and a second body 612 in which a first microsphere emitting hole 612a connected with the third pipe 10c has been formed. The first body 611 and the second body 612 have been connected to each other and inside which storing space 61a is formed. The cross-section area of the second body 612 may be narrower as it is farther from the part connected to the first body 611. That is, the second body 612 may have a cyclone structure.

The first microspheres which have moved along the second pipe 10b and flowed in the storing space 61a through the first microsphere inflow hole 611a may gradually descend to the direction of the first microsphere emitting hole 612a. At that time, in storing space 61a, a downdraft may be formed and the descending first microspheres may be mixed.

The gas supplier for storing 62 may be connected to the first body 611 and inject flowing gas into the storing space 61a. Following the flow of the flowing gas the first microspheres may be mixed.

The storing stirrer 63 may comprise a shaft 631 arranged in the storing space 61a to be rotatable and a plurality of stirring blades 632 that are protrusive to the perimeter direction from the shaft 631. The storing stirrer 63 may rotate for the object like mixing when the first microspheres descend, or the first microspheres have been stored in the storing space 61a.

Due to the rotation of the storing stirrer 63 the first microsphere may descend with being mixed. In addition, the storing stirrer 63 helps the first microsphere not to lump, by mixing of the first microsphere stored in the storing space 61a.

Meanwhile, the first microsphere emitting hole 612a may be connected to the packer 70 through the third pipe 10c in which the third pump 20c has been arranged. Due to the operation of the third pump 20c the first microspheres in the storing space 61a may move along the third pipe 10c and flow into the packer 70. The components of the third pump are the same with embodiments of the first pump 20a; thus, duplicated description will be omitted.

On the third pipe 10c, a filter 30b which separates metallic substance from the object of filtering comprising the flowing first microspheres may be arranged. The filter 30b may be arranged between the third pump 20c and the storage 60. The first microspheres may pass through the inside of the filter 30b and at that time metallic substance may be attached to be eliminated by magnetic force of a magnet. The components of this filter 30b are same with embodiments of the filter 30a; thus, duplicated description will be omitted.

The packer 70 may store the first microspheres which have flowed in following the third pipe 10c and may pack the first microspheres with sorting by the preset unit.

The classifying and purifying apparatus for a solid blowing agent according to the present embodiment may separate metallic substance from the object of filtering comprising the first microspheres or the solid blowing agent using the filter. Thereby economic efficiency may be enhanced because faults of a polishing pad caused from metallic substance are prevented so damage of a wafer is prevented.

In addition, the solid blowing agent is treated with classifying into the first microspheres to the third microspheres, and metallic substance thereof is separated from the object of filtering, after that the remains are applied to manufacture of a polishing pad. In manufacturing processes of the polishing pad, additive reactions that could be caused from moisture of microspheres can be prevented. In addition, foreign substance having high density, lumps, an unblown solid blowing agent, and the like, are eliminated in advance before being mixed with a polymer resin, so that the quality of the manufactured polishing pad can be enhanced, and the number of defects of the product like a wafer polished by the polishing pad can be decreased remarkably.

The classifying and purifying apparatus according to another embodiment of the present disclosure comprises a classifier 50, and filters 30a, 30b. The classifier 50 comprises a classifying housing 51, a gas supplying hole 515 and an emitting hole for classifying. The emitting hole for classifying may comprise a first microsphere emitting hole 513 and a second microsphere emitting hole 514. The classifier 50 has classifying space 511 which may classify a solid blowing agent into first microspheres and second microspheres. Nitrogen gas or dry gas (flowing gas) may be supplied to classifying space 511 through the gas supplying hole 515. The flowing gas induces classification of the solid blowing agent in the classifying space 511. The classified first microspheres may be emitted through the first microsphere emitting hole 513 for classifying. The filters 30a, 30b may be arranged on the moving route of the solid blowing agent or the first microspheres (a first pipe and a third pipe) to separate metallic substance from the solid blowing agent or the first microspheres.

The classifier and filter according to the present embodiment have the same formation and operation effect of the classifier and filter according to embodiments from FIG. 1 to FIG. 6 thus duplicated description will be omitted.

Above this, to other formations the formations of embodiments from FIG. 1 to FIG. 6 may be applied in a same way.

The classifying and purifying apparatus of a solid blowing agent according to another embodiment of the present disclosure, comprises a classifier 50, a storage 60 and a magnetic filter, and the classifier 50 comprises a classifying housing 51, a classifying stirrer 55 and an emitting hole for classifying. The emitting hole for classifying may comprise a first microsphere emitting hole 513 and a second microsphere emitting hole 514. The classifying stirrer 55 comprises a shaft 551 and a stirring blade 552, and the storage 60 comprises a storing housing 61 and a storing stirrer 63. The magnetic filter is arranged on the moving route of the object of filtering comprising a solid blowing agent or first microspheres. Specifically, the magnetic filter may be arranged in any one location selected from the group consisting of the front of the classifier 50, the position between the classifier 50 and the storage 60, the rear of the storage 60, and compositions thereof, and separates metallic substance from the object of filtering.

The classifier, storage, and magnetic filter according to the present embodiment have same formation and operation effect with the classifier, storage and filter according to embodiments from FIG. 1 to FIG. 6 thus duplicated description will be omitted.

Above this, to other formations the formations of embodiments from FIG. 1 to FIG. 6 may be applied in a same way.

The classifying and purifying method of a solid blowing agent according to one embodiment, provides a solid blowing agent which is purified and classified, by comprising a classifying step and a filtering step.

The classifying step is the step of classifying a solid blowing agent into first microspheres and second microspheres depending on the descent rate of the solid blowing agent which is raised by flowing gas supplied to the classifying space.

The filtering step is the step of purifying the first microspheres by separating them from metallic substance using a magnetic filter when they pass a filter.

The flowing gas is dry air or inert gas, and the first microspheres are adjusted to have a moisture content of 3 wt % or less.

The magnetic filter provides the classified solid blowing agent in which metallic foreign substance is minimalized by eliminating metallic substance from the solid blowing agent of the first microspheres. Thereby the polishing layer having a polishing characteristic and less defects may be provided.

Hereinafter, specific example embodiments will be described in more detail. The embodiments are just examples, and the range of the present disclosure is not limited thereto.

1. Formation of a Polishing Layer
  1) Classifying of Hollow Microspheres

Hollow microspheres (Expancel, average particle size of 5.5 μm, moisture content of 3.5%, density of 47.2 kg/m$^3$) that were not classified by a classifying apparatus were introduced into a classifying and purifying apparatus of a solid blowing agent. For Comparative Example 1, a magnetic filter was not applied and only classifying was performed is presented, and for Comparative example 2, Example 1 and Example 2 nitrogen gas was retrieved after classifying and purifying had been performed is presented. A magnetic filter was arranged between a storage and a classifier in the rear of the classifier for performing the experiment. Vibration rotation was performed by operating a vibration rotator installed in the apparatus, and whether it was applied or not is presented in Table 1 below.

Moisture content was measured using HX204 (available from METTLER TOLEDO), by weighing 1 to 3 g from each sample, heating them at a temperature of 120° C. for 1 minute 30 seconds, and confirming the weight increase and decrease thereof.

Density was measured using AccuPyc 1340 (available from MICROMERITICS INSTRUMENT CORPORATION) after samples had been put into cells of 10 cc and weighed.

Average particle size was measured by dispersing samples in ethanol solvent through S3500+(available from MICROTRAC).

TABLE 1

|  | Comparative Example 1 | Comparative Example 2 | Example 1 | Example 2 |
|---|---|---|---|---|
| Flowing Gas | Not Applied | Nitrogen Gas | Nitrogen Gas | Nitrogen Gas |
| Whether Vibration Is Applied | ◯ | ◯ | ◯ | ◯ |
| Whether a Magnetic Filter Is Applied | X | X | ◯ | ◯ |
| Moisture Content after the Process (%) | 3.5 | 1 | 1.1 | 1 |
| Density of the Solid Blowing Agent (kg/m$^3$) | 47.2 | 45.2 | 45.2 | 45.1 |
| Property Average Particle Size (μm) | 35.5 | 31.3 | 31.5 | 31.0 |
| Metal Elimination Rate (mg/Kg) | 0 | 0 | 98 | 106 |

Referring to the Table 1 above, in all Comparative 2, Example 1, and Example 2 it was verified that moisture content after the process was decreased compared to Comparative Example 1, and in case of average particle size or density, it was verified that the example embodiments classified and purified had lower values. In case of metal elimination rate also, the elimination rates of the metal eliminated by applying a magnetic filter were presented as 98 mg/Kg and 106 mg/Kg in Example 1 and Example 2 respectively, thus it is verified that metallic foreign substance was eliminated through a magnetic filter in a considerable amount.

2) Manufacture of a Polishing Layer

An urethan-based prepolymer (NCO of 9.1%, weight average molecule quantity of 1,200), a curing agent (Bis(4-amino-3-chlorophenyl)methane)), inert gas ($N_2$), the microspheres classified above, a reaction rate regulator (tertiary amine-based compound) and so on were put into a mixture manufacturing apparatus and mixed thereby manufacturing a curable mixture. The microspheres were applied in an amount of 2 parts by weight based on 100 parts by weight of the urethan-based prepolymer. The curable mixture was injected to a mold (width of 1,000 mm, length of 1,000 mm, height of 3 mm) after being mixed thereby obtaining a sheet. The sheet was grinded with a surface grinder and grooved using a tip, through these processes polishing layers with average thickness of 2 mm were manufactured, respectively.

2. Property Evaluation of the Polishing Layer

Using CMP polishing apparatus, a silicon wafer with a diameter of 300 mm, in which a silicon oxide membrane was formed, manufactured by the method of TEOS-plasma CVD was installed, after that setting of the silicon wafer was performed, in which the silicon oxide membrane side of the wafer to direct below, on the surface plate attached with the porous polyurethan polishing pad. After that, adjusting the polishing load to be 1.4 psi was performed and rotating of the polishing pad with 121 rpm, injecting of calcined silica slurry with rate of 190 ml/minute and rotating of the surface plate with 115 rpm for 60 seconds were carried out, thereby polishing the silicon oxide membrane.

After polishing, the silicon wafer was detached from a carrier, equipped to a spin dryer, and cleaned with purified water (DIW), after that it was dried with air for 15 seconds. In the dried silicon wafer, the variation of membrane thickness before and after polishing was measured using an optical interference type thickness measuring apparatus, and the polishing rate (remove rate) was calculated.

The dried silicon wafer was polished, and the number of defects thereof was measured using a defect measuring apparatus (model XP+, available from TENCOR). Defect means micro scratch or chatter mark. The result below was measured by applying with silicon wafers having a diameter of 300 mm and the number of defects was evaluated based on an area of 70685.83 $mm^2$.

TABLE 2

| | Comparative Example 1 | Comparative Example 2 | Example 1 | Example 2 |
|---|---|---|---|---|
| Polishing Rate (Remove Rate) | 4095 A/min | 4150 A/min | 4098 A/min | 4100 A/min |
| The Number of Defects | 1550 | 800 | 120 | 110 |

Referring to the result of Table 2, all comparative examples and examples show polishing rates within the certain range, so that whether applying microsphere classified or not classified was evaluated as not bringing a great difference to the polishing rate. However, the number of defects shows great differences, particularly if a magnetic filter was applied in the classifying process, it was verified that the number of defects was decreased remarkably.

According to the example embodiments described herein, a classifying and purifying apparatus of a solid blowing agent separates metallic substance and so on from the object of filtering including a solid blowing agent or first microspheres by a filter. Thereby faults of a polishing pad caused from metallic substance can be prevented so that damage of a wafer caused from the faults of a polishing pad can be prevented; therefore, economic efficiency can be increased.

According to the example embodiments described herein, a magnet inside a holder generating magnetic force of a filter material has been accommodated to be able to be withdrawn. Thereby metallic substance separated from the object of filtering can be attached to the holder by magnetic force of the magnet. When the holder is withdrawn from the object of filtering and the magnet is withdrawn from the holder, metallic substance attached to the holder may be eliminated due to the absence of the magnetic force. Thereby eliminating of metallic substance attached to the holder can be easy so workability of users may be increased.

According to the example embodiments described herein, a solid blowing agent may be processed to be classified, wherein metallic substance may be separated from the object of filtering, and after that the filtered object is applied to manufacture of a polishing pad. In manufacturing processes of the polishing pad, the additive reaction, which could be generated by moisture of microspheres and so on, can be prevented. In addition, by eliminating foreign substance having high density, lumps, an unblown solid blowing agent, and so on in advance, quality of the manufactured polishing pad can be further enhanced, and for the product such as a wafer polished by the polishing pad the number of defects can be remarkably decreased.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A classifying and purifying apparatus of a solid blowing agent comprising:
    a classifier, which classifies a supplied solid blowing agent into first microspheres and second microspheres and comprises a vortex generating material located in a classifying space of the classifier;
    a storage connected to the classifier, in which the classified first microspheres flow in to be stored and emitted; and
    a filter arranged on the moving route of the solid blowing agent or the first microspheres, which separates metallic substance from an object of filtering comprising the solid blowing agent or the first microspheres.

2. The apparatus of claim 1, wherein the filter comprises:
    a filter housing comprising an inside filter space configured to pass the solid blowing agent or the first microspheres;
    a filter cover arranged on the filter housing to be detachable for opening and closing of the filter space; and a filter material arranged in the filter space and generating magnetic force, and wherein the metallic substance is attached to the filter material by the magnetic force.

3. The apparatus of claim 2, wherein the filter material comprises:
a holder located in the filter space; and
a magnet arranged on the holder, and
wherein the metallic substance is attached to the holder to be eliminated from the object of filtering.

4. The apparatus of claim 2, wherein a filter inlet connected to the filter space is formed in the filter housing, and
the filter inlet is connected to a direction tangent to a perimeter of the filter space in a lower portion of the filter housing.

5. The apparatus of claim 2, wherein the object of filtering moves in a vortex when contacting with the filter material, in the filter space.

6. The apparatus of claim 2, wherein a filter outlet, which emits the object of filtering in which the metallic substance has been eliminated in the filter space, is formed in the filter housing or the filter cover.

7. The apparatus of claim 6, wherein the filter cover is arranged on an opened side of the filter housing, the filter outlet is formed on the filter cover, and the object of filtering gradually ascends when contacting with the filter material in the filter space to be emitted to the outside of the filter housing through the filter outlet.

8. The apparatus of claim 1, wherein the solid blowing agent has a density of 100 kg/m$^3$ or less.

9. The apparatus of claim 1, wherein the classifier comprises:
a classifying housing comprising an inside classifying space;
a gas supplying hole connected to the classifying space; and
an emitting hole configured to classify and connected to the classifying space,
wherein the classifying space is configured to classify a solid blowing agent into first microspheres and second microspheres,
wherein the first microspheres are emitted from the emitting hole,
wherein the gas supplying hole is configured to supply flowing gas, the flowing gas being dry air or inert gas, and
wherein the first microspheres have a moisture content of 3 wt % or less.

10. The apparatus of claim 1, wherein the classifier comprises:
a classifying housing comprising an inside classifying space,
a classifying stirrer arranged in the classifying space, and
an emitting hole configured to classify which connects the classifying space with the storage,
wherein the classifying stirrer comprises:
a shaft arranged along a vertical length direction of the classifying housing to be rotatable, and
a plurality of stirring blades arranged along the length direction of the shaft, and
wherein the filter is arranged in any one location selected from the group consisting of in front of the classifier, a position between the classifier and the storage, in rear of the storage, and combinations thereof.

11. A classifying and purifying apparatus of a solid blowing agent comprising:
a classifier in which classifying space is formed, and
a filter arranged in front, in rear, or in front and in rear of the classifier,
wherein the classifier comprises:
a classifying housing comprising the classifying space,
a gas supplying hole connected to the classifying space,
an emitting hole configured to classify connected to the classifying space, and
a gas emitting hole and an emitting filter arranged in the gas emitting hole,
wherein the classifying space classifies a solid blowing agent into first microspheres and second microspheres, the first microspheres being emitted from the emitting hole, and
wherein the filter separates metallic substance from an object of filtering that is inflowed.

12. The apparatus of claim 11, wherein the classifier further comprises a vortex generating material located in the classifying space and arranged to neighbor on the gas supplying hole.

13. The apparatus of claim 11, wherein the classifier further comprises a vibration generator arranged in the classifying housing.

14. The apparatus of claim 11, further comprising:
a supplier which supplies the solid blowing agent to the classifier,
a storage in which the first microspheres flow in to be stored, and
a retriever in which the second microspheres are retrieved.

15. The apparatus of claim 11,
wherein the gas supplying hole supplies flowing gas, the flowing gas is dry air or inert gas, and the first microspheres have a moisture content of 3 wt % or less.

16. A method of classifying and purifying a solid blowing agent comprising:
classifying a solid blowing agent into first microspheres and second microspheres depending on a descent rate of the solid blowing agent which is raised by flowing gas supplied to a classifying space; and
purifying the first microspheres by separating them from metallic substance using a magnetic filter when they pass the filter,
wherein a vortex generating material is disposed in the classifying space.

17. The method of claim 16,
wherein the flowing gas is dry air or inert gas, and the first microspheres have a moisture content of 3 wt % or less.

18. The apparatus of claim 9, wherein the vortex generating material is arranged to neighbor on the gas supplying hole.

19. The apparatus of claim 1, wherein the classifier further comprises a gas emitting hole, and an emitting filter arranged in the gas emitting hole.

* * * * *